United States Patent [19]

Starcevic

[11] 4,292,554
[45] Sep. 29, 1981

[54] RADIALLY AERATED DISC ROTOR

[75] Inventor: Mihailo Starcevic, Mellingen, Switzerland

[73] Assignee: BBC Brown, Boveri & Company, Limited, Baden, Switzerland

[21] Appl. No.: 92,336

[22] Filed: Nov. 8, 1979

[30] Foreign Application Priority Data

Nov. 27, 1978 [CH] Switzerland .................. 12101/78

[51] Int. Cl.³ .................................................. H02K 9/00
[52] U.S. Cl. ........................................ 310/58; 310/91; 310/261
[58] Field of Search ................ 310/63, 58, 59, 60, 310/61, 157, 261, 266, 267, 42, 91, 62, 268

[56] References Cited

U.S. PATENT DOCUMENTS 2,994,793  8/1961  Sills ........................................ 310/61
3,272,444  8/1963  Rich ....................................... 310/40 R

FOREIGN PATENT DOCUMENTS 578794  8/1976  Switzerland ..................... 310/61

*Primary Examiner*—R. Skudy
*Attorney, Agent, or Firm*—Oblon, Fisher, Spivak, McClelland & Maier

[57] ABSTRACT

A radially aerated disc rotor is manufactured in such a manner that the inner diameters of the annular discs (8) are greater than the outer diameter of the hub (1, 2) and that the hub (1, 2) is connected with the annular discs (8) which bear a rotor collar (9) by means of canted ribs (4, 5) only. The canted ribs (4,5) serve as bearing, guiding and ventilation elements. Preferably, the canted ribs (4,5) consist of inner (4) and outer (5) portions, their connection preferably being made by welding, preferably within zones of minimum mechanical stress where they are also easily accessible. The disc rotor is particularly suited for large machinery and provides sufficient cooling because of the large area provided for the ingress of cooling air.

5 Claims, 2 Drawing Figures

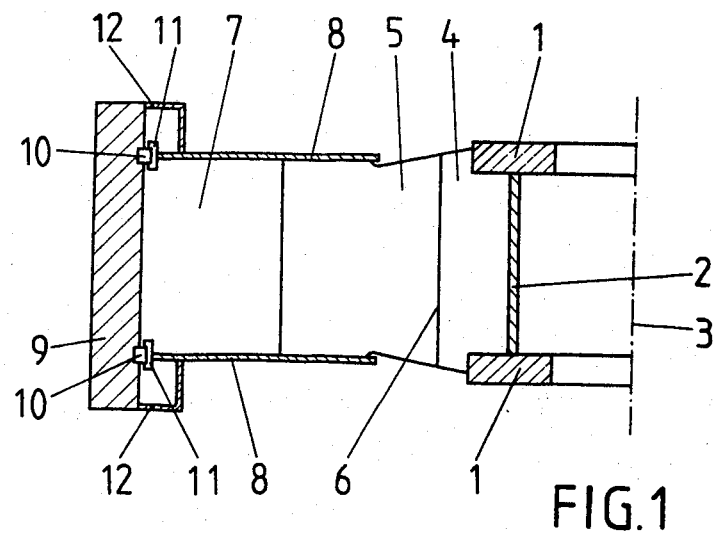
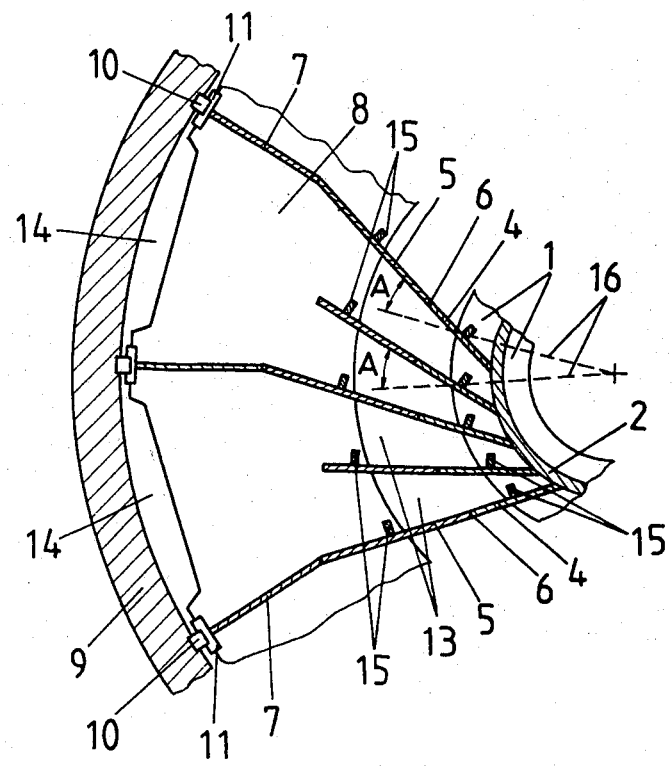

RADIALLY AERATED DISC ROTOR

BACKGROUND OF THE INVENTION

1. Field of the Invention

The present invention relates to a radially aerated disc rotor with a rotor collar and a hub, an annular portion with canted ribs extending between these two parts, their ends unilaterally connected with two annular discs of the disc rotor.

2. Description of the Prior Art

In Swiss Pat. No. CH-PS 578 794 the rotor of an electrical engine is described and illustrated in which a central body and a collar of a revolving field form two concentric rings which are connected by means of a multitude of spokes which are evenly distributed around the circumference of said collar. These spokes define in the radial direction, identical acute angles at their points of attachment to the central body in the circumferential direction. In one embodiment, the aforementioned spokes are arranged between the collar of the revolving field and two annular discs which are welded to the shaft. Thus, these discs practically constitute the hub of the rotor. In the aforementioned patent, the spokes are represented as being in a jointed connection. In the instance of large rotors, however, and for reasons of transportation, this part of the construction is welded on location, or a fastening of the spokes by means of screws is chosen. By these modes of attachment however, the hub of the rotor becomes deformed, so that it requires further work after being set up, i.e. mostly after the welding process.

In U.S. Pat. US PS No. 2,994,793, an embodiment of a disc rotor is described and illustrated whereby ventilation arms are arranged between two discs and whereby the torque between the hub and the rotor collar is transfered by means of these discs only. These discs prevent the ingress of cooling air at the lateral surfaces of the disc rotor, so that only a relatively small area remains for the air to enter.

SUMMARY OF THE INVENTION

An object of the present invention is to create a disc rotor of the type described above which does not incorporate the disadvantages of the known rotors and where the canted ribs alone transfer the torque onto the hub while, at the same time, serving as aerating ribs. The invention is intended to facilitate a disc rotor construction which is suitable for extremely large electrical engines and which simplifies the set-up of the entire rotor.

It is a particular advantage of the invention that the canted ribs which, at their points of attachment, define acute angles with the radial directions, advantageously perform the function of aerating ribs from an aerodynamic point of view, whereby large surfaces for the ingress of cooling air are formed between the hub and the annular discs. The canted ribs also serve for the centering of the rotor collar relative to the hub, not only when affected by centrifugal force but also when under stress because of heat expansion, since they permit simultaneous expansion of the discs and the hub. In this manner the hub is nearly completely freed from the effects of the centrifugal and heat expansion forces. Should highly sensitive bearings or gears be attached to the annular hub portions, they also are protected from undesirable deformation and wear.

A further feature of the invention is that the connecting points of the inner and the outer portions of the canted ribs are located between the hub and the discs, so that they are easily accessible. This easy accessibility of these connecting points makes it possible to ascertain the concentricity of the hub and the rotor collar during set-up. The hub and the disc portion of the rotor need not be of identical axial lengths because the difference in lengths can be made up by the form of the canted ribs. This makes it possible to build a relatively long hub, resulting in greater axial stiffness of the rotor.

A further feature of the invention is that the mechanically weaker parts of the canted ribs with the connecting points, i.e. the welded connections, are located in the little used areas between the attached ends of the canted ribs. In the case of large engines there is enough space between hub and discs and between the canted ribs so that the welded areas are accessible and welding can easily be done. Since, preferably, the canted ribs are manufactured as relatively thin plates, the hub is not deformed during the welding operation at the canted ribs. The tensile stress of the welded seams therefore does not exert any influence upon the hub.

A further feature of the present invention is that the radial ribs connect the two discs and that in doing so they are not bent by their own centrifugal force, because the proper centrifugal forces act within the rib planes, i.e. in the radial planes.

A further feature of the invention is that resistance to bending of the canted ribs in their axial cross sections is increased, so that they may be manufactured with smaller dimensions. In doing so, the bending of the ribs because of centrifugal force components at right angles of the rib plane is reduced.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 shows a view of a canted rib, extended by means of a radial rib, as well as an axial section through a hub and one outer rotor portion; and FIG. 2 shows a radial cross-section through a preferred embodiment according to FIG. 1, as viewed between the annular discs of the outer rotor portion.

DETAILED DESCRIPTION OF THE PREFERRED EMBODIMENTS

Identical parts in FIGS. 1 and 2 have identical numbers.

According to FIG. 1, two annular hub portions 1 are welded together with a cylindrical hub portion 2. The drawing shows merely one half of the hub, at the left of axis 3. An inner portion 4 of a canted rib is connected with the hub 1, 2. An outer portion 5 of the canted rib is connected with two annular discs 8. The inner portion 4 and the outer portion 5 of the canted rib are welded together at the point of connection 6. A radial rib 7 is provided as an extension of the canted ribs 4, 5. A rotor collar 9 is connected with the radial rib 7 and the annular discs 8 by way of wedges 10 and wedge carrier 11. The rotor collar 9 is provided with an air canal 12 located beside the annular discs 8. As can be seen from FIG. 1, an annular space exists between the hub portion 1 and the discs 8. This annular space permits the admission of cooling medium into the areas 13 between the ribs, from both axial sides of the ribs. All constructions not necessary for the understanding of the invention, as, for instance, the poles of the field with their connections and the radial cooling channels in the rotor collar, have been omitted.

In FIG. 2, free areas 13 are shown between the canted ribs 4, 5 and free areas 14 are depicted between the annular disc 8 and the rotor collar 9. The canted ribs 4, 5 are provided with stiffening ribs 15, running parallel to the axis of the rotor. The canted ribs 4, 5, at their points of connection, enclose identical acute angles A with radial lines 16 from the annular hub portions 1. In the embodiment shown in FIG. 2, three of the depicted five canted ribs 4, 5 are extended by the radial ribs 7.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A radially aerated disc rotor comprising:
   a central hub having an axis and an outer diameter;
   a plurality of ribs having one end connected to said hub, said ribs extending from said hub, said ribs each being canted from a radial line through said hub;
   an annular disc being fixed to each axial edge of the other end of said canted ribs, said annular discs having an inner diameter greater than said outer diameter of said central hub, to form an annular portion therebetween wherein said central hub and said discs are connected only through said ribs, wherein an annular space exists between both said annular discs and said hub to admit the flow of cooling medium into the area between said ribs from both axial sides of said ribs; and
   a rotor collar supported by said discs.

2. The rotor of claim 1, wherein each of said canted ribs are formed as a discrete inner portion and a discrete outer portion, said inner portion forming a unit with said hub and said outer portion forming a unit with said annular discs.

3. The rotor of claim 2, wherein said inner and outer portion are welded and said weld is located in the vicinity of the minimum mechanical stress on said ribs.

4. The rotor of claim 1 including radial ribs extending radially from said other ends of said canted ribs and between said annular discs, and being fastened to said rotor collar, said rotor collar being supported by said discs through said radial ribs.

5. The rotor of claim 1 wherein at least some of said canted ribs include axial reinforcing ribs.

* * * * *